(12) United States Patent
Wu et al.

(10) Patent No.: US 9,183,091 B2
(45) Date of Patent: Nov. 10, 2015

(54) CONFIGURATION INFORMATION BACKUP IN MEMORY SYSTEMS

(71) Applicant: Intel Corporation, Santa Clara, CA (US)

(72) Inventors: Ning Wu, Folsom, CA (US); Robert E. Frickey, Sacramento, CA (US); Hanmant P. Belgal, El Dorado Hills, CA (US); Xin Guo, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 13/628,356

(22) Filed: Sep. 27, 2012

(65) Prior Publication Data

US 2014/0089563 A1 Mar. 27, 2014

(51) Int. Cl.
*G06F 12/00* (2006.01)
*G06F 9/445* (2006.01)
*G06F 11/14* (2006.01)

(52) U.S. Cl.
CPC .................................. *G06F 11/1417* (2013.01)

(58) Field of Classification Search
CPC .............................. G06F 11/14; G06F 3/0679
See application file for complete search history.

(56) References Cited

U.S. PATENT DOCUMENTS

| 7,539,077 | B2 * | 5/2009 | Yoon et al. ............... 365/230.08 |
| 7,702,897 | B2 * | 4/2010 | Reed et al. .................... 713/100 |
| 8,095,711 | B2 * | 1/2012 | Hallivuori ....................... 710/74 |
| 2009/0265510 | A1 * | 10/2009 | Walther et al. ................ 711/114 |
| 2009/0271564 | A1 * | 10/2009 | Sugimoto et al. ............. 711/103 |
| 2013/0166893 | A1 * | 6/2013 | Dusija et al. ...................... 713/2 |
| 2013/0339784 | A1 * | 12/2013 | Bickelman et al. .......... 714/6.11 |

OTHER PUBLICATIONS

Open NAND Flash Interface Specification, Revision 3.0, Mar. 9, 2011, pp. 1-275.*

* cited by examiner

*Primary Examiner* — Aimee Li
*Assistant Examiner* — Edmund Kwong
(74) *Attorney, Agent, or Firm* — Chapin IP Law, LLC

(57) ABSTRACT

According to one configuration, a memory system includes a configuration manager and multiple memory devices. The configuration manager includes status detection logic, retrieval logic, and configuration management logic. The status detection logic receives notification of a failed attempt by a first memory device to be initialized with custom configuration settings stored in the first memory device. In response to the notification, the retrieval logic retrieves a backup copy of configuration settings information from a second memory device in the memory system. The configuration management logic utilizes the backup copy of the configuration settings information retrieved from the second memory device to initialize the first memory device.

19 Claims, 7 Drawing Sheets

| MEMORY DEVICE | LOCATION OF COPY OF C.S.I. | NAME OF COPY |
|---|---|---|
| 110-1 | 110-2 | 205-1 |
| 110-2 | 110-3 | 205-2 |
| 110-3 | 110-4 | 205-3 |
| ... | ... | |

MAP
410

FIG. 4

CONFIGURATION INFORMATION BACKUP IN MEMORY SYSTEMS

TECHNICAL FIELD

Embodiments of the present disclosure generally relate to configuration, reconfiguration, use, etc., of one or more memory devices in a memory system.

BACKGROUND

Computer systems have long implemented use of memory devices to store data. One reason for the widespread use of non-volatile memory such as solid-state devices in lieu of rotating disk drives is speed. For example, access to data in non-volatile solid-state memory (e.g., a stationary physical circuit device) is typically much quicker than access to data stored in a disk (e.g., a physically rotating storage medium). A downside of using non-volatile memory as opposed to using a spinning disk drive storage is cost. That is, the cost per bit to store data in memory can be considerably higher than the cost per bit to store data in a disk drive.

BRIEF DESCRIPTION OF THE DRAWINGS

FIG. 4 is an example diagram illustrating a map specifying locations of backup copies of configuration settings information according to embodiments herein.

DESCRIPTION OF THE EMBODIMENTS

Figure 1:
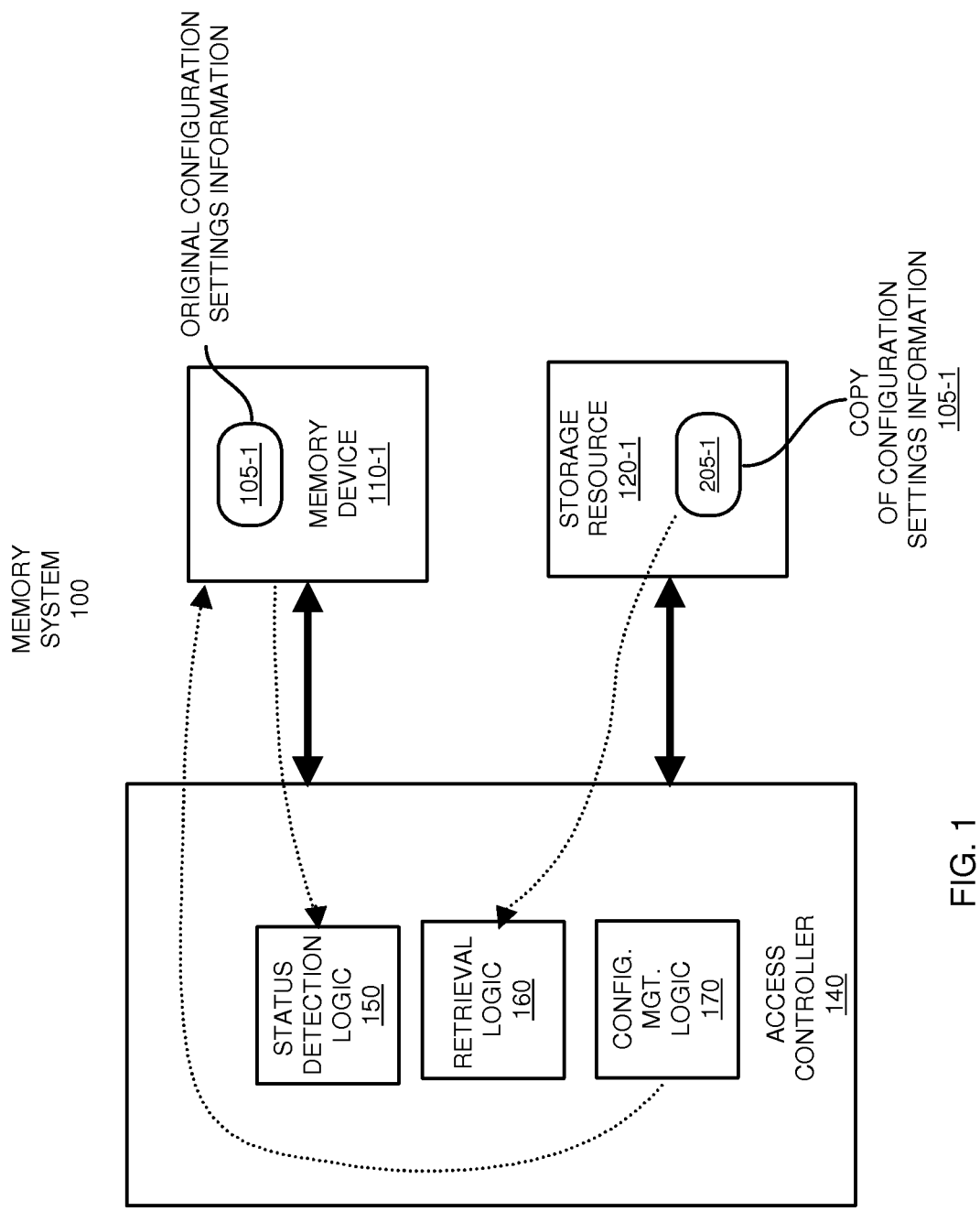
FIG. 1 is an example diagram illustrating a memory system according to embodiments herein.

Certain types of flash memory devices have been used in so-called SSD (Solid State Drive) devices. Each memory device in a SSD configuration buffer can be configured to store one or more copies of its own custom configuration information to configure itself. As an example, upon power up of a respective memory device, a configuration manager circuit in the respective memory device accesses locally stored settings information in the respective memory device to configure the memory device for subsequent access. If the configuration setting information stored in the respective memory device becomes corrupted for any reason, the configuration manager circuit in the respective memory device cannot properly configure the respective memory device for subsequent use.

In certain conventional instances, because it is possible that locally stored configuration data can become corrupted, the flash memory manufacturers may include and store an extra copy of configuration information in the corresponding memory device. In other words, a memory device can include multiple memory blocks to locally store multiple copies of the same custom configuration settings information. In such an instance, if a set of primary configuration information stored in one block of the memory device is corrupted, the backup set of configuration information in another block of the same memory device may be used to initialize the memory device for subsequent use.

Conventional memory systems such as those including multiple non-volatile memory devices are prone to failure. Vulnerability to failure increases with an increasing number of non-volatile memory devices because it is more likely that at least one non-volatile memory device will fail.

Memory device failures can occur due to a number of different reasons. For example, as discussed above, each non-volatile memory device in a respective memory system can include a specially allocated storage region (e.g., a region of ROM known also as Read Only Memory) in which to store configuration settings information such as trim data, redundancy information, etc., associated with the respective memory device.

Upon power up of the memory device, a configuration manager circuit in the respective memory device retrieves the configuration settings information stored in the specially allocated storage region and, using the retrieved configuration settings information, initializes the respective memory device for subsequent use. Upon power up, each memory device in a memory system can be configured to operate in a similar manner so that they are all properly configured for subsequent use after power is applied.

The stored configuration information in the specially allocated storage region in the non-volatile memory device can become corrupted due to old age. For example, corruption can be caused by mechanisms such as intrinsic charge loss, single bit charge loss, etc., of storage cells in the region. In such an instance, when data becomes corrupt, the memory device cannot be properly initialized for subsequent use. That is, a memory device cannot be properly configured without use of proper configuration settings information. If the memory device cannot be properly configured, the memory device cannot be properly accessed.

Occurrence of a single failing memory device in a memory system may render the entire memory system unusable because the failed memory device may store critical data.

Embodiments herein include novel failure recovery techniques directed to improving the reliability of a memory system including one or more memory devices over conventional systems.

More specifically, in one non-limiting example embodiment, an non-volatile memory controller logic in a memory system stores one or more backup copies of custom configuration settings information (e.g., settings such as trims, redundancy, etc.) for each non-volatile memory device in at least one other non-volatile memory device in the memory system. When a memory system powers up during usage, if any memory device in the memory system indicates a failure to initialize properly using its locally stored configuration settings information, the controller recovers from the failure by utilizing an appropriate backup copy of configuration settings information stored in another memory device to configure the failing device.

Failure recovery as discussed herein can significantly reduce, if not eliminate, occurrence of non-volatile memory device failures caused by corruption of locally stored configuration settings information.

Now, referring more specifically to the figures, FIG. 1 is an example diagram illustrating a general implementation of a memory system and recovering from a self-configuration failure according to embodiments herein.

As shown, example memory system 100 includes an access controller 140 and at least memory device 110-1. Access controller 140 (e.g., non-volatile memory controller logic) includes status detection logic 150, retrieval logic 160, and configuration management logic 170.

Note that the memory system 100 additionally can include logic such as hardware, software, firmware, etc., to perform the different functions (e.g., status detection logic 150, retrieval logic 160, configuration management logic 170, etc.) as discussed herein. In one embodiment, the access controller 140 such as a non-volatile memory controller logic supports collective functionality provided by status detection logic 150, retrieval logic 160, configuration management logic 170.

Each of the resources disclosed in FIG. 1 can be any suitable type of resource. For example, the memory device 110-1 can be a non-volatile type memory device (e.g., NAND flash, NOR flash, Magnetoresistive Random Access Memory, Ferroelectric Random Access Memory, personal computer memory system, Phase Change Memory (PCM), Phase Change Memory with Switch (PCMS), etc.) or any suitable type of non-volatile memory that enables storage of data. Additionally or alternatively, the access controller 140 and its corresponding logic components can be executed via any suitable type of resource such as an ASIC (Application Specific Integrated Circuit), processor executing instructions, firmware, hardware, software, etc.

In this example embodiment, the status detection logic 150 performs a query to memory device 110-1 to learn whether memory device 110-1 is properly configured to enable reads and/or writes of data. Assume that, in response to the query, the status detection logic 150 detects occurrence of a failure with respect to initialization or configuration of the memory device 110-1 using locally stored configuration settings information 105-1 in the memory device 110-1. For example, in one embodiment, the memory device 110-1 includes appropriate internal circuitry to attempt configuration of the memory device 110-1 using locally stored configuration settings information 105-1 in the memory device 110-1. In such an instance, the response to the inquiry as received by the status detection logic 150 indicates whether respective circuitry in the memory device 110-1 was unable to configure the respective memory device 110-1 using locally stored configuration settings information 105-1.

The inability of the memory device 110-1 to configure itself using its locally stored configuration settings information 105-1 can occur for a number of reasons. For example, as mentioned, the storage cells of the assigned memory in the memory device 110-1 used to store the configuration settings information 105-1 can fail, resulting in corrupted data; the circuitry in the memory device 110-1 to initialize the memory device 110-1 can fail, resulting in the inability to configure the memory device 110-1; etc.

In response to receiving occurrence of the failure notification, the retrieval logic 160 initiates retrieval of a copy of the configuration settings information 205-1 (e.g., a backup copy) stored in storage resource 120-1. In one embodiment, the copy of configuration settings information 205-1 is identical or substantially identical to the configuration settings information 105-1 stored in the memory device 110-1. By way of a non-limiting example, note that the storage resource 120-1 can be another non-volatile memory device in the memory system 100. This will be discussed in more detail later in this specification.

In response to the failed configuration by the memory device 110-1, the configuration management logic 170 utilizes the copy of the configuration settings information 205-1 retrieved from the remote storage resource 120-1 such as another non-volatile memory device in the memory system to initialize the non-volatile memory device 110-1 with appropriate configuration settings for subsequent access to storage cells of the non-volatile memory device 110-1. Thus, even though the memory device 110-1 may initially fail self-initialization or self-configuration, the access controller 140 and corresponding functionality can intervene and recover from the failure. That is, the access controller 140 can memory device 110-1 can aid in configuration of the memory device 105-1 in the event of a failure.

Figure 2:
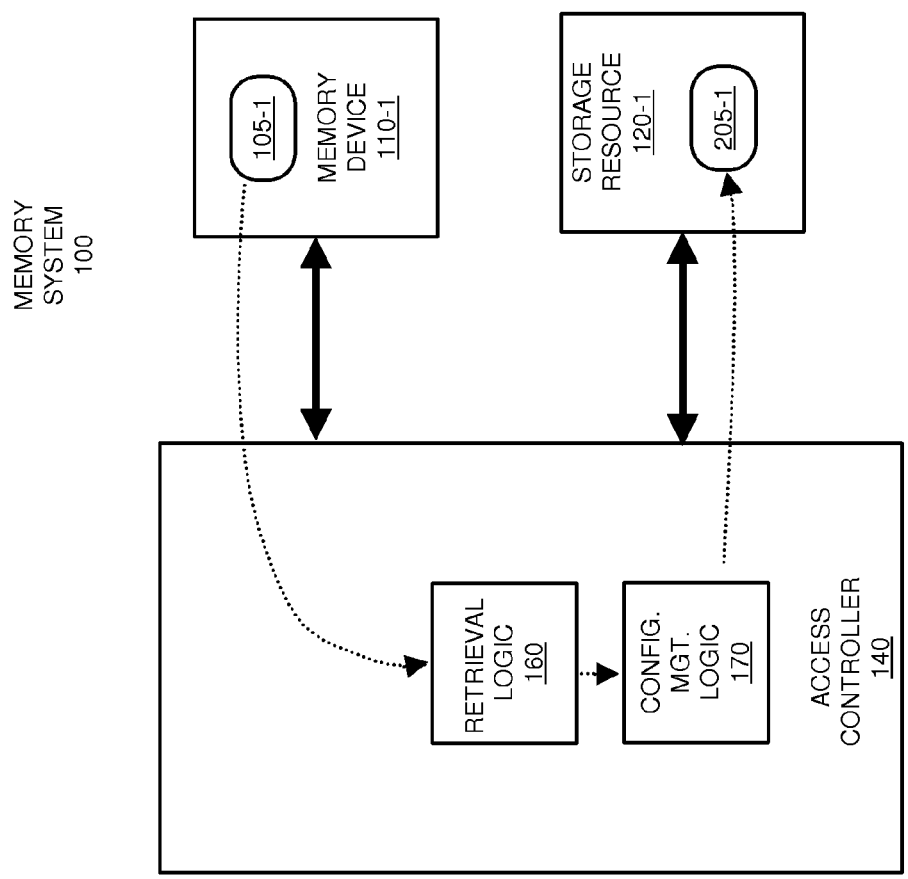
FIG. 2 is an example diagram illustrating management of configuration settings information according to embodiments herein.

FIG. 2 is an example diagram illustrating management of configuration settings information according to embodiments herein.

A copy of the original configuration settings information 105-1 associated with memory device 110-1 can be stored in the memory device 110-1 in any suitable manner and/or time. For example, in accordance with one embodiment, a copy of configuration settings information 105-1 associated with the memory devices 110 can be written to the storage resource 120-1 at a time of manufacturing the memory system 100, a copy of the configuration settings information 105-1 can be created and stored while the memory system 100 in used in the field, etc.

In accordance with one embodiment, the retrieval logic 160 (or other suitable resource) can be configured to retrieve a copy of the configuration settings information 105-1 and initiate storage of a copy of configuration settings information 105-1 as configuration settings information 205-1 in storage resource 120-1. As previously mentioned, the backup copy of the configuration settings information 205-1 can be the same or substantially similar to the configuration settings information 105-1 stored in memory device 105-1.

The configuration settings information 105-1 can be modified during field use. In such an instance, in response to an adjustment to the configuration settings information 105-1, the access controller 140 can be configured to retrieve a latest version of the configuration settings information 105-1 and store a copy of such data in storage resource 120-1 as configuration settings information 205-1.

Figure 3:
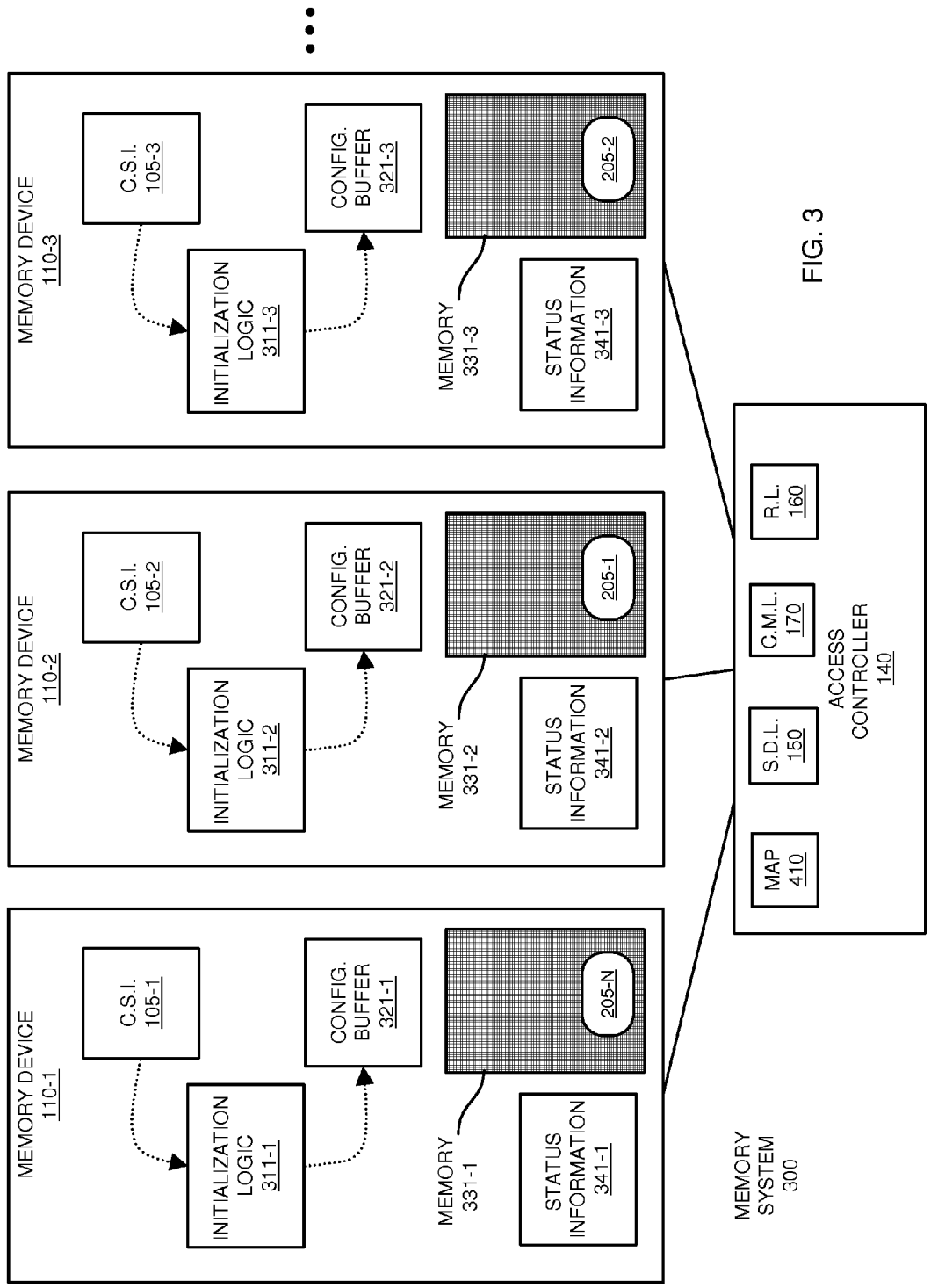
FIG. 3 is an example diagram illustrating management of a memory system according to embodiments herein.

FIG. 3 is an example diagram illustrating a memory system according to embodiments herein.

In this non-limiting example embodiment, memory system 300 includes memory device 110-1, memory device 110-2, memory device 110-3, and so on. Each of the memory devices 110 is a non-volatile memory device.

Each of the memory devices 110-1, 110-2, 110-3, etc., (collectively, memory devices 110) includes a portion of memory such as ROM, writeable non-volatile memory, or other suitable type of resource to store respective custom configuration settings information associated with the respective memory device. That is, each of memory devices 110 may be uniquely manufactured. The variability in each of the memory devices 110 may require that each memory device be loaded with configuration settings information in order for the respective memory device to operate properly for a particular application.

As previously discussed, generation, storage, updating, etc., of the custom configuration settings information in the memory devices 110 can occur at any suitable time such as manufacture of the respective memory device, manufacture of the memory system 100, etc.

In this example embodiment, the memory device 110-1 stores first custom configuration settings information 105-1 indicating how to initialize or configure the memory device 110-1 for subsequent memory accesses; the memory device 110-2 stores first custom configuration settings information 105-2 indicating how to initialize or configure the memory device 110-2 for subsequent memory access; the memory device 110-3 stores first custom configuration settings information 105-3 indicating how to initialize or configure the memory device 110-3 for subsequent memory access; and so on.

During a power up condition, such as when power is initially applied to the memory devices 110, the respective initialization logic 311 in the memory devices 110 initiates self-initialization or self-configuration including an internal transfer or loading of the custom configuration settings information in a device to the corresponding buffer (e.g., set of latches, registers, etc.) in the memory device.

As a more specific example, upon power up, the initialization logic 311-1 in memory device 110-1 utilizes the configuration settings information 105-1 stored in the memory device 110-1 to initialize configuration buffer 321-1; the initialization logic 311-2 in memory device 110-2 utilizes the configuration settings information 105-2 stored in the memory device 110-2 to initialize configuration buffer 321-2; the initialization logic 311-3 in memory device 110-3 utilizes the configuration settings information 105-3 stored in the memory device 110-3 to initialize configuration buffer 321-3; and so on.

Initialization can include loading of settings as specified by the configuration settings information into the respective configuration buffer. The configuration settings information can include so-called trim information. In accordance with one embodiment, the configuration settings information for each of the memory devices 110 can include essential NAND settings such as trim information that controls how NAND operates (e.g., erase, program, read algorithm, etc.), redundancy that contains bad blocks remapped during remanufacture and other important information, etc. More specifically, the trim information can specify: how to set parameters of a clock used by a controller in the memory device, how to set a voltage, offset information, minimum or maximum program voltage settings, etc.

Each of the memory devices 110 can include one or more resources to generate and store respective status information indicating whether a respective memory device is properly configured for use. For example, memory device 110-1 generates and stores status information 341-1 indicating whether the initialization logic 311-1 was able to properly load configuration settings information 105-1 into configuration buffer 321-1; memory device 110-2 generates and stores status information 341-2 indicating whether the initialization logic 311-2 was able to properly load configuration settings information 105-2 into configuration buffer 321-2; memory device 110-3 generates and stores status information 341-3 indicating whether the initialization logic 311-3 was able to properly load configuration settings information 105-3 into configuration buffer 321-3; and so on.

The access controller 140 communicates with each of the memory devices 110 over any suitable type of communication interface such as a NAND device interface, ONFI (Open NAND Flash Interface), etc. The status information for each respective memory device can be retrievable from a predetermined set of one or more addresses for the device. In certain instances, the access controller 140 can output commands to the memory devices 110 to control their operation and/or modes.

Subsequent to at least an attempted self-initialization by each of the memory devices 110 as discussed above, the status detection logic 150 of access controller 140 performs a query to respective memory devices 110 to determine if any of the memory devices 110 were not properly configured for use based on use of internally stored configuration settings information 105.

In one embodiment, each of the memory devices 110 can be individually queried. For example, the status detection logic 150 communicates with memory device 110-1 to retrieve status information 341-1 associated with memory device 110-1; the status detection logic 150 communicates with memory device 110-2 to retrieve status information 341-2 associated with memory device 110-2; and so on.

The access controller 140 analyzes the retrieved status information 341. If there were no initialization failures, it is assumed that each of the memory devices 110 was properly configured using the corresponding locally stored configuration settings information. In other words, assume that each of the memory devices 110 has properly self-initialized with appropriate configuration settings. In such an instance, the respective status information 341 retrieved from the memory devices 110 will indicate there were no configuration failures. In this example scenario, because there were no detected errors, the access controller 140 is able to then access data stored in or write data to corresponding memory 331-1, memory 331-2, memory 331-3, and so on.

As previously discussed, there are a number of reasons why self-initialization by the respective memory devices 110 may fail. That is, the respective configuration buffers 321 may not be properly loaded on a power up or reset condition. For example, the block of memory allocated to store respective configuration settings information 105 in the respective memory device may fail. A block failure may be so significant that a corresponding error correction code cannot be used to fix retrieved configuration settings information. Additionally, the respective initialization logic 311 in a memory device may be defective, resulting in the inability to initialize the configuration buffers. The configuration buffer in which the data is to be loaded may be defective; and so on.

Assume in this example that a configuration failure occurred when the initialization logic 311-1 in memory device 110-1 was unable to properly load configuration buffer 321-1 with configuration information based on locally stored configuration settings information 105-1. One way the initialization logic 311-1 can detect occurrence of an error is to attempt to load configuration buffer 321-1 and access the configuration buffer 321-1 to determine the failure to be properly loaded. In such an instance, the initialization logic 311-1 sets appropriate flags in the status information 341-1 indicating occurrence of the failure. Assume further in this example that each of the other memory devices (e.g., memory device 110-2, memory device 110-3, and so on) was able to properly initialize itself. In such an instance, status information 341-2 indicates that memory device 110-2 was properly configured, status information 341-3 indicates that memory device 110-3 was properly configured, and so on.

Prior to accessing (e.g., reading or writing to) memory devices 110, the access controller 140 retrieves and analyzes respective status information 341-1, status information 341-2, status information 341-3, etc., to determine a health of the memory system 100. Assume in this example in which initialization fails in the memory device 110-1 that the status information 341-1 indicates that initialization of the memory device 110-1 has failed. However, assume that the status information 341-2, status information 341-3, etc., associated with the other memory devices 110-2, 110-3, etc., indicates that the respective initialization logic 341-2, 341-3, etc., is able to properly initialize the memory devices 110-2, 110-3, etc., using configuration settings information 105-2, 105-3, etc.

In accordance with embodiments herein, the access controller 140 can be configured to recover from the self-initialization failure of memory device 110-1 without having to physically replace the memory device 110-1 with a new part. That is, as an alternative to physically replacing with the memory device 110-1 with a new part due to a detected configuration failure, the access controller 140 attempts to render the existing memory device 110-1 usable again.

As an example, the access controller 140 includes map 410. As shown in FIG. 4, map 410 indicates that a backup copy of the configuration settings information 205-1 (i.e., a copy of the configuration settings information 105-1) associated with failing memory device 110-1 is stored in memory device 110-2.

Note that, in one embodiment, map 410 can include specific reference information such as a start and end addresses with respect to memory 331-1 where the copy of the configuration settings information 205-1 is stored. The specific information also can indicate a block, multiple blocks, etc., where the information is stored.

In accordance with map 410, as shown, a copy of configuration settings information 105-2 is stored in memory device 110-3 as configuration settings information 205-2; a copy of configuration settings information 105-3 is stored in memory device 110-4 as configuration settings information 205-3; and so on.

Thus, via map 410, the access controller 140 is able to identify a location of at least one backup copy of configuration settings information for each memory device.

To provide higher reliability, it may be desirable to store multiple backup copies of configuration settings information in each of multiple different memory devices in the memory system 100. For example, a copy of the configuration settings information 105-1 can be stored in memory device 110-2 (as previously discussed) as well as memory device 110-3; a copy of configuration settings information 105-2 configuration buffer stored in memory device 110-3 and memory device 110-4; and so on.

Referring again to FIG. 3, as previously discussed, the status detection logic 150 accesses and analyzes the respective status information 341 to determine whether a self-initialization failed in any of the memory devices 110.

As mentioned, in response to detecting the failure of memory device 110-1, the access controller 140 utilizes map 410 to identify a location of a backup copy of configuration settings information 105-1 due to the failure of the memory device 110-1 to properly self-initialize. In response to the failure, and as specified by the map 410, the retrieval logic 160 initiates retrieval of configuration settings information 205-1 stored in memory 331-2 of memory device 110-2. Recall again that configuration settings information 205-1 is a backup copy of configuration settings information 105-1.

By way of a non-limiting example embodiment, subsequent to retrieval of (backup) configuration settings information 205-1, the configuration management logic 170 can be configured to attempt to overwrite or store the copy of configuration settings information 105-1 with the retrieved configuration settings information 205-1. The overwriting of data in an attempt to fix corrupted data may or may not be successful as the storage resource of memory device 110-1 originally assigned to store the configuration settings information 105-1 may or may not be permanently damaged.

Subsequent to the attempted overwrite, the access controller 140 and/or memory device 110-1 can generate a control signal, reset signal, etc., to the memory device 110-1 to cause the initialization logic 311-1 to attempt self-initialization of the memory device 110-1 again.

In a manner as previously discussed, the status information 341-1 indicates whether the latest initialization was a success or failure. Status detection logic 150 initiates retrieval of the updated status information 341-1 to determine if the most recent initialization attempt was successful. If so, the access controller 140 is able to access all of the memory devices 110 in memory system 100 because the memory device 110-1 has been repaired. On the other hand, if the latest attempt to correct (such as via the overwrite) the configuration settings information in the memory device 110-1 fails, the configuration management logic 170 can attempt to directly load the configuration buffer 321-1 with appropriate settings in configuration buffer 321-1 in accordance with the copy of configuration settings information 205-1. This second attempt to properly configure the configuration buffer 321-1 in the memory device 110-1 may be successful if the overwrite fails.

Thus, according to embodiments herein, after receiving notification that the memory device 110-2 has been properly initialized (e.g., via self-initialization or repair) or configured using its corresponding configuration settings information 105-2, the configuration management logic 170 can access the memory device 110-2 and initiate initialization of the memory device 110-1 using with the copy of the configuration settings information 205-1 stored in memory device 110-2.

As previously discussed, the configuration management logic 170 may perform the configuration of memory device 110-1 in response to detecting a failed attempt by a circuit (e.g., initialization logic 311-1) in the memory device 110-1 to initialize the memory device 110-1 using the configuration settings information 105-1.

In a similar manner, if self-initialization of memory device 110-2 fails, the access controller 140 can be configured to use configuration settings information 205-2 stored in memory device 110-3 to repair memory device 110-2, and so on. This technique of recovery or repair as discussed herein can be used on any memory device that fails to properly self-initialize.

Figure 5:
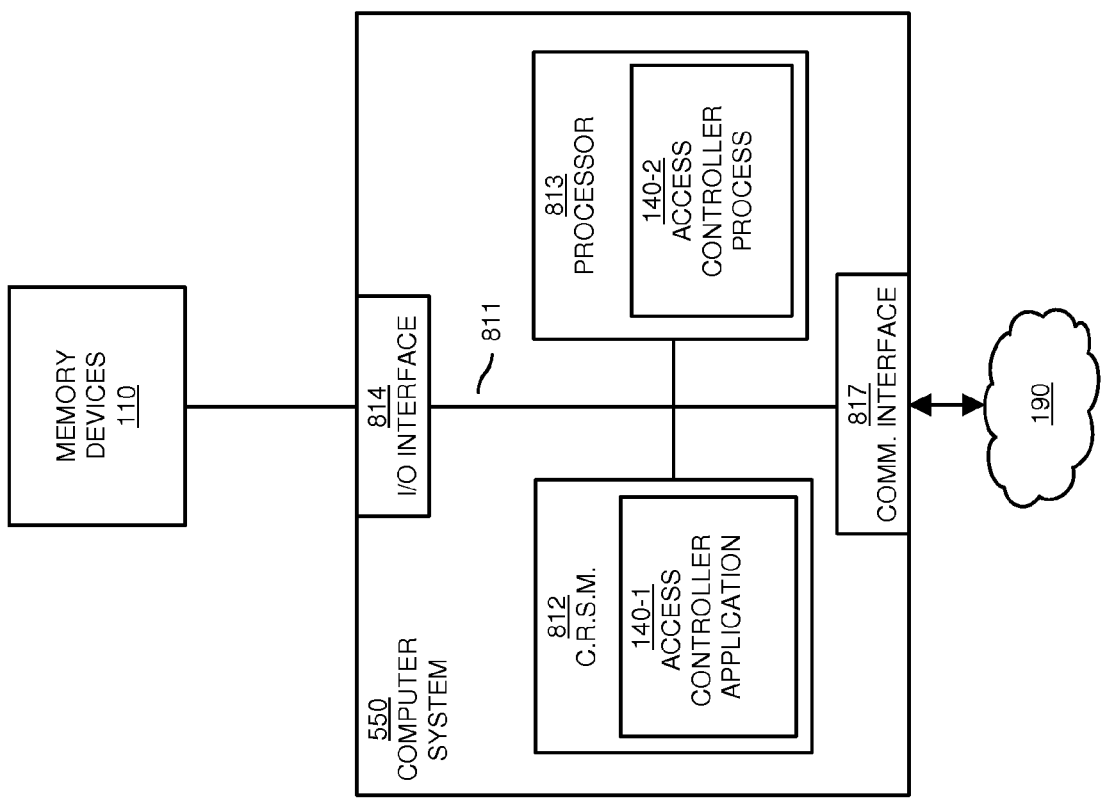
FIG. 5 is an example diagram illustrating a processing architecture to execute one or more methods according to embodiments herein.

FIG. 5 is an example block diagram of a computer system for implementing any of the operations as discussed herein according to embodiments herein.

Computer system 550 can be configured to execute any of the operations with respect to access controller 140 and/or corresponding resources such as status detection logic 150, retrieval logic 160, configuration management logic 170, etc.

As shown, computer system 550 of the present example can include an interconnect 811 that couples computer readable storage media 812 such as a non-transitory type of media (i.e., any type of hardware storage medium) in which digital information can be stored and retrieved, a processor 813 (i.e., one or more processor devices), I/O interface 814, and a communications interface 817.

I/O interface such as an ONFI interface 814 provides connectivity to memory devices 110.

Computer readable storage medium 812 can be any hardware storage device such as memory, optical storage, hard drive, floppy disk, etc. In one embodiment, the computer readable storage medium 812 (e.g., a computer readable hardware storage) stores instructions and/or data.

Communications interface 817 enables the computer system 550 and processor 813 to communicate over a resource such as network 190 to retrieve information from remote sources and communicate with other computers. I/O interface 814 enables processor 813 to retrieve stored information from a repository such as memory devices 110.

As shown, computer readable storage media 812 is encoded with access controller application 140-1 (e.g., software, firmware, etc.) executed by processor 813. Access controller application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in access controller application 140-1 stored on computer readable storage medium 812.

Execution of the access controller application 140-1 produces processing functionality such as access controller process 140-2 in processor 813. In other words, the access controller process 140-2 associated with processor 813 represents one or more aspects of executing access controller application 140-1 within or upon the processor 813 in the computer system 550.

Those skilled in the art will understand that the computer system 550 can include other processes and/or software and hardware components, such as an operating system that controls allocation and use of hardware resources, software resources, etc., to execute access controller application 140-1.

In accordance with different embodiments, note that computer system 550 may be any of various types of devices, including, but not limited to, a mobile computer, a personal computer system, a wireless device, base station, phone device (memory devices can be located in the phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by the different resources will now be discussed via flowcharts in FIG. 6. Note that the processing in the flowcharts below can be executed in any suitable order.

Figure 6:
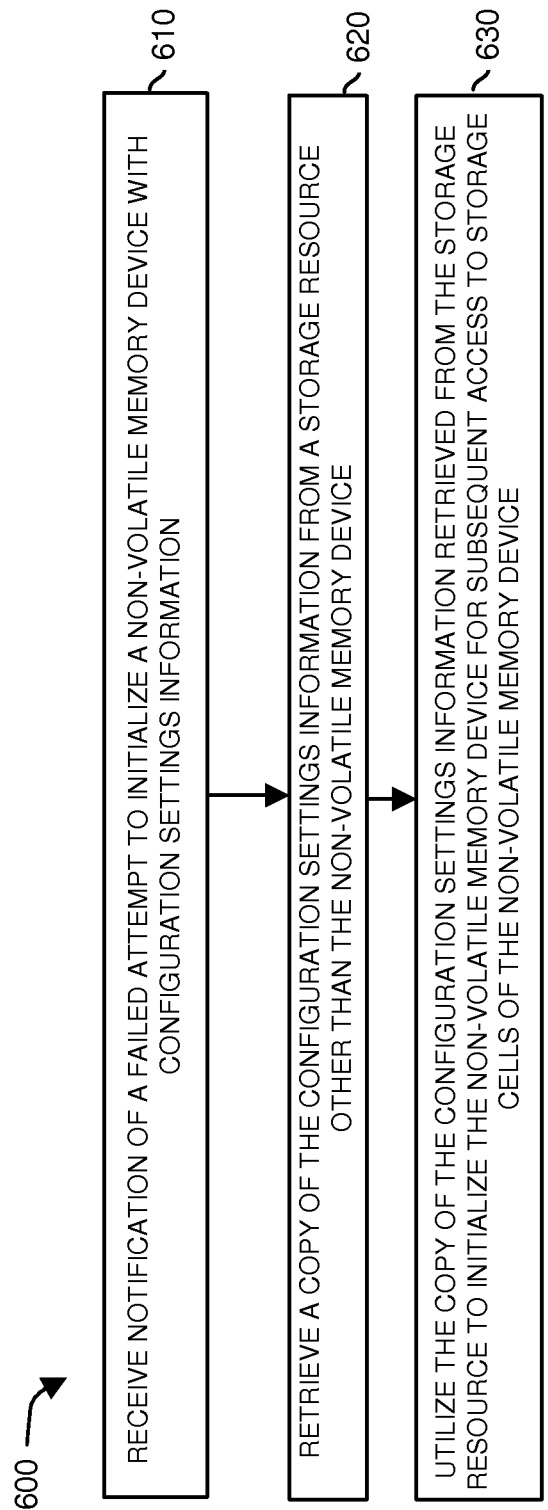
FIG. 6 is an example flowchart illustrating a method according to embodiments herein.

FIG. 6 is a flowchart 600 illustrating an example method according to embodiments. Note that there will be some overlap with respect to concepts as discussed above.

In processing block 610, the status detection logic 150 receives notification of a failed attempt to initialize a non-volatile memory device 110-1 with configuration settings information 105-1.

In processing block 620, the retrieval logic 160 retrieves a copy of the configuration settings information 205-1 from storage resource 120-1.

In processing block 630, the configuration management logic 170 utilizes the copy of the configuration settings information 205-1 retrieved from the storage resource 120-1 such as memory device 110-2 to initialize the non-volatile memory device 110-1 for subsequent access to storage cells of the non-volatile memory device 110-1.

Figure 7:
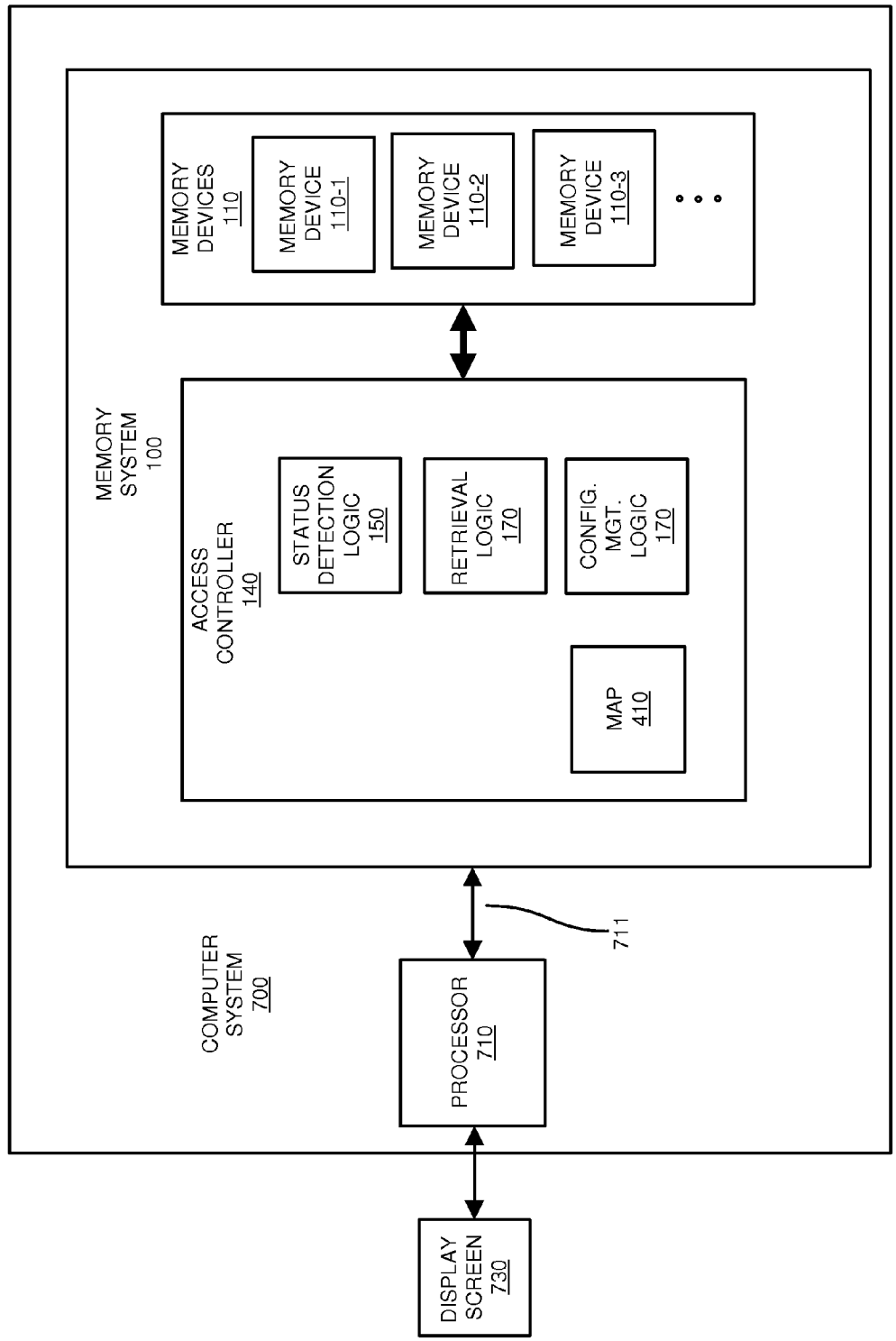
FIG. 7 is an example diagram illustrating use of a memory system in a SSD (Solid State Drive) according to embodiments herein.

FIG. 7 is an example diagram illustrating use of a memory system as a SSD (Solid State Drive) according to embodiments herein.

As shown, computer system 700 can include a processor 710 and memory system 100. Processor 710 can be or include one or more processor devices. Computer system 700 can be any suitable type of resource such as a personal computer, cellular phone, mobile device, camera, etc., using memory system 100 to store data. By way of a non-limiting example, memory system 100 can be a solid-state drive (i.e., SSD) to store data.

As previously discussed, memory system 100 can include an access controller 140 (e.g., status detection logic 150, retrieval logic 160, configuration management logic 170, etc.) and one or more memory devices 110. Any of one or more of the memory devices 110 can be non-volatile memory devices.

Processor 710 has access to memory system 100 via interface 711. Interface 711 can be any suitable link enabling data transfers. For example, the interface 711 can be a SCSI (Small Computer System Interface), SAS (Serial Attached SCSI), SATA (Serial Advanced Technology Attachment), USB (Universal Serial Bus), PCIE (Peripheral Component Interconnect Express) bus, etc.

Via interface 711, the processor 710 (e.g., a processor device) in computer system 700 is able to convey data to access controller 140. Access controller 140, in turn, writes the data to memory devices 110.

Via interface 711, the processor 710 of computer system 700 is able to retrieve data from memory devices 100. For example, the processor 710 sends a request to the access controller 140 to retrieve data. The access controller 140 retrieves the requested data from memory devices 110 and conveys the data to processor 710 over interface 711.

In one embodiment, the computer system 700 includes a display screen 730 on which to render one or more images based on data stored in the first non-volatile memory device 110-1 and/or the second non-volatile memory device 110-2. The first non-volatile memory device 110-1 and the second non-volatile memory device 110-2 can be disposed in more specifically 100 such as a solid state drive to which the computer system 700 has access through an access controller 140.

Different Permutations of Disclosed Example Embodiments

A first example embodiment as discussed herein includes an apparatus, the apparatus comprises: status detection logic configured to receive notification of a failed attempt by a non-volatile memory device to be initialized with configuration settings; retrieval logic configured to, in response to the notification, retrieve a backup copy of configuration settings information from a remote storage resource with respect to the non-volatile memory device; and configuration management logic configured to utilize the backup copy of the configuration settings information retrieved from the remote storage resource to initialize the non-volatile memory device with the configuration settings for subsequent access to storage cells of the non-volatile memory device.

The first example embodiment can be implemented along with any of one or more of the following features to produce yet different embodiments:

For example, in accordance with a further embodiment, the status detection logic can be configured to receive the notification from the non-volatile memory device, the notification indicates the failed attempt by the non-volatile memory device to retrieve a locally stored copy of the configuration settings information in the non-volatile memory device.

In accordance with another embodiment, the configuration management logic can be configured to, in response to the received notification, initiate storage of the backup copy of the configuration settings information to a memory block of the non-volatile memory device.

In yet another embodiment, the notification of the failed attempt can be a first notification. The configuration management logic can be configured to receive a second notification subsequent to receiving the first notification. The second notification can indicate that initialization logic in the non-volatile memory device is unable to initialize a set of configuration buffers in the non-volatile memory device using the backup copy of the configuration settings information stored in the memory block. In response to receiving the second notification, the configuration management logic can be configured to write the backup copy of the configuration settings information to the set of configuration buffers to initialize the non-volatile memory device.

In accordance with further embodiments, the memory device can be a first non-volatile memory device amongst multiple non-volatile memory devices in the memory system. The storage resource can be a second non-volatile memory device in the memory system. The retrieval logic can be configured to retrieve the backup copy of the configuration settings information from the second non-volatile memory device, the second non-volatile memory device disparately located with respect to the first non-volatile memory device in the memory system.

In yet another embodiment, the retrieval logic can be configured to retrieve the backup copy of the configuration settings information from the second non-volatile memory device subsequent to receiving notification from the second non-volatile memory device that the second non-volatile memory device was able to properly initialize the second non-volatile memory device based on corresponding configuration settings information stored in the second non-volatile memory device.

The non-volatile memory device can be a first non-volatile memory device amongst multiple non-volatile memory devices in a memory system. The configuration management logic can be configured to map the identity of the first non-volatile memory device in the memory system to a second non-volatile memory device in the memory system. The second non-volatile memory device stores the backup copy of the configuration settings information. In such an instance, the retrieval logic retrieves the backup copy of the configuration settings information from the second non-volatile memory device to initialize the first non-volatile memory device for use.

In further embodiments, the status detection logic receives the notification of the failed attempt from the non-volatile memory device at or around a time of power up during which initialization logic in the non-volatile memory device attempts to initialize the non-volatile memory device based on retrieval of a copy of the configuration settings information from a memory block in the non-volatile memory device to configuration buffers in the non-volatile memory device.

In one embodiment, the apparatus can be an access controller comprising at least one processor device. A computer system can be configured to communicate with the access controller to access the storage cells in the non-volatile memory device of the memory system. The non-volatile memory device can be one of multiple non-volatile memory devices in a solid-state drive to which the computer system has access through the access controller.

A second example embodiment as discussed herein includes a method, the method comprises: receiving notification of a failed attempt to initialize a non-volatile memory device with configuration settings information; retrieving a copy of the configuration settings information from a storage resource other than the non-volatile memory device; and utilizing the copy of the configuration settings information retrieved from the storage resource to initialize the non-volatile memory device for subsequent access to storage cells of the non-volatile memory device.

The second example embodiment can be implemented along with any of one or more of the following features to produce yet further embodiments:

For example, in one embodiment, the second example embodiment can include receiving the notification from the non-volatile memory device, the notification indicating the failed attempt by the non-volatile memory device to retrieve a locally stored copy of the configuration settings information in the non-volatile memory device to initialize the non-volatile memory device.

In yet another embodiment, the second example embodiment can include initiating storage of the configuration settings information to a memory block of the non-volatile memory device, data in the memory block used by a controller in the non-volatile memory device to initialize a set of configurations buffers in the non-volatile memory device.

In another embodiment, the notification can be a first notification. The second example embodiment can further include: receiving a second notification, the second notification indicating that the controller in the non-volatile memory device was unable to initialize the non-volatile memory device using the copy of the configuration settings information in the memory block to initialize the set of configuration buffers; and in response to receiving the second notification, writing the copy of the configuration settings information to the set of configuration buffers to initialize the non-volatile memory device.

In another embodiment, the non-volatile memory device can be a first non-volatile memory device amongst multiple non-volatile memory devices in the memory system. The second example embodiment can further include: retrieving the copy of the configuration settings information from a second non-volatile memory device in the memory system, the second non-volatile memory device disparately located with respect to the first non-volatile memory device in the memory system.

In yet another example embodiment, the non-volatile memory device can be a first non-volatile memory device amongst multiple non-volatile memory devices in a memory system notification can be a first notification. The second example embodiment can further include: mapping the identity of the first non-volatile memory device in the memory system to a second non-volatile memory device in the memory system, the second non-volatile memory device storing the copy of the configuration settings information; and retrieving the copy of the configuration settings information from the second non-volatile memory device.

In another embodiment, the second example embodiment can further include: receiving the notification of the failed attempt from the non-volatile memory device at power up during which a controller in the non-volatile memory device attempts to initialize the non-volatile memory device based on retrieval of and storage of information from a non-volatile memory block in the non-volatile memory device to configuration buffers of the non-volatile memory device.

In another embodiment, the second example embodiment can further include: retrieving the copy of the configuration settings information from the second non-volatile memory device subsequent to receiving notification from the second non-volatile memory device that the second non-volatile memory device was able to properly initialize the second non-volatile memory device based on corresponding configuration settings information stored in the second non-volatile memory device.

In another embodiment, the second example embodiment can further include: receiving the notification from the non-volatile memory device, the notification indicating that initialization logic in the non-volatile memory device was unable to properly initialize the non-volatile memory device for subsequent access.

A third example embodiment as discussed herein includes an apparatus, the apparatus comprises: a first non-volatile memory device, the first non-volatile memory device storing first custom configuration settings information indicating how to initialize the first non-volatile memory device for subsequent memory access; a second non-volatile memory device, the second non-volatile memory device storing second custom configuration settings information indicating how to configure the second non-volatile memory device for subsequent memory access; and the second non-volatile memory device storing a copy of the first custom configuration settings information.

The third example embodiment can be implemented along with any of one or more of the following features to produce yet different embodiments:

For example, in accordance with a further embodiment, the retrieval logic can be configured to retrieve a copy of the first custom configuration settings information from the first non-volatile memory device. The configuration management logic can be configured to store the copy of the first custom configuration settings information in the second non-volatile memory device.

In yet another embodiment, the retrieval logic can be configured to retrieve the copy of the first custom configuration settings information from the second non-volatile memory device. The configuration management logic can be configured to initialize the first non-volatile memory device using the retrieved copy of the first custom configuration settings information retrieved from the second non-volatile memory device.

In accordance with further embodiments, the configuration management logic can be configured to initialize the first non-volatile memory device with the copy of the first custom configuration settings information in the second non-volatile memory device in response to detecting a failed attempt by a circuit in the first non-volatile memory to initialize the first non-volatile memory device using the first custom configuration settings information stored in the first non-volatile memory device.

Additionally, in accordance with another embodiment, the configuration management logic can be configured to retrieve the copy of the first custom configuration settings information from the second non-volatile memory device stored after receiving notification that the second non-volatile memory device has been initialized using the second custom configuration settings information stored in the second non-volatile memory device.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments.

Yet other embodiments herein include software programs, firmware, logic, etc. to perform operations as disclosed herein. One such embodiment comprises a computer program product including a non-transitory computer-readable storage medium (i.e., any computer readable hardware storage medium) on which software instructions are encoded for subsequent execution. The instructions, when executed in a computerized device having one or more processors, program and/or cause the processor to perform the operations disclosed herein. Such arrangements can be provided as software, firmware, code, instructions, data (e.g., data structures), etc., arranged or encoded on a non-transitory computer readable storage medium such as an optical medium (e.g., CD-ROM), floppy disk, hard disk, memory, etc., or other a medium such as firmware or shortcode in one or more ROM, RAM, PROM, etc., or as logic in an Application Specific Integrated Circuit (ASIC), etc. The software or firmware or other such configurations can be installed onto a computerized device to cause the computerized device to perform the techniques explained herein.

Accordingly, embodiments herein are directed to an apparatus, a method, a system, a computer program product, etc., that supports operations as discussed herein.

One embodiment includes a computer readable storage medium and/or system having instructions, logic, etc., stored thereon to manage configuration of a memory system including one or more non-volatile memory devices. The instructions, and/or logic, when executed by at least one processor device of a respective computer, cause the at least one processor device to: receive notification of a failed attempt to initialize a non-volatile memory device with configuration settings information; retrieve a copy of the configuration settings information from a storage resource other than the non-volatile memory device; and utilize the copy of the configuration settings information retrieved from the storage resource to initialize the non-volatile memory device for subsequent access to storage cells of the non-volatile memory device.

Note that any of the processing as discussed herein can be performed in any suitable order.

It is to be understood that the apparatus, system, method, apparatus, instructions on computer readable storage media, etc., as discussed herein also can be embodied strictly as a software program, firmware, as a hybrid of software, hardware and/or firmware, or as hardware alone such as within a processor device, within an operating system or a within a software application, etc.

Additionally, note that although each of the different features, techniques, configurations, etc., herein may be discussed in different places of this disclosure, it is intended, where suitable, that each of the concepts can optionally be executed independently of each other or in combination with each other. Any permutation of the disclosed features is possible. Accordingly, the one or more embodiments as described herein can be embodied and viewed in many different ways.

Note further that techniques herein are well suited for recovering from a detected failure in one or more non-volatile memory devices. However, it should be noted that embodiments herein are not limited to use in such applications and that the techniques discussed herein are well suited for other applications as well.

While specific embodiments have been particularly shown and described, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the embodiments herein are presented in the following claims.

The invention claimed is:

1. An apparatus comprising:
non-volatile memory controller firmware configured to:
receive notification of a failed attempt by a first non-volatile memory device to initialize the first non-volatile memory device using configuration settings information stored in the first non-volatile memory device, the configuration settings information unique to initializing the first non-volatile memory device amongst multiple non-volatile memory devices;

in response to the notification, retrieve a backup copy of configuration settings information from a second non-volatile memory device; and utilize the backup copy of the configuration settings information retrieved from the second non-volatile memory device to initialize the first non-volatile memory device with the configuration settings for subsequent access to storage cells of the first non-volatile memory device;

the apparatus further comprising retrieval firmware configured to retrieve the backup copy of the configuration settings information from the second non-volatile memory device, the second non-volatile memory device disparately located with respect to the first non-volatile memory device in a memory system;

wherein the retrieval firmware is further configured to retrieve the backup copy of the configuration settings information from the second non-volatile memory device subsequent to receipt of notification from the second non-volatile memory device that the second non-volatile memory device was able to properly initialize the second non-volatile memory device based on corresponding configuration settings information stored in the second non-volatile memory device, the corresponding configuration settings information stored in the second non-volatile memory device being unique to initialize the second non-volatile memory device.

2. The apparatus as in claim 1 further comprising status detection firmware, the status detection firmware configured to receive the notification of the failed attempt from the first non-volatile memory device, the notification indicating the failed attempt by the first non-volatile memory device to retrieve a locally stored copy of the configuration settings information in the first non-volatile memory device.

3. The apparatus as in claim 1 further comprising configuration management firmware configured to, in response to the received notification of the failed attempt, initiate storage of the backup copy of the configuration settings information to a memory block of the first non-volatile memory device.

4. The apparatus as in claim 1, wherein the non-volatile memory controller firmware is to map an identity of the first non-volatile memory device in the memory system to an identity of the second non-volatile memory device in the memory system, the second non-volatile memory device to store the backup copy of the configuration settings information.

5. The apparatus as in claim 1, wherein the non-volatile memory controller firmware to receive the notification of the failed attempt from the first non-volatile memory device at a time of power up during which initialization firmware in the first non-volatile memory device attempts to initialize the first non-volatile memory device based on retrieval of a copy of the configuration settings information from a memory block in the first non-volatile memory device to configuration buffers in the first non-volatile memory device.

6. A computer system including the apparatus in claim 1, the computer system further comprising:

a display screen on which to render an image based on data stored in the first non-volatile memory device and the second non-volatile memory device.

7. The computer system as in claim 6, wherein the first non-volatile memory device and the second non-volatile memory device are disposed in a solid state drive to which the computer system has access through an access controller.

8. A method comprising:

receiving notification of a failed attempt by a first non-volatile memory device to self-initialize the first non-volatile memory device with first configuration settings information stored in the first non-volatile memory device;

retrieving a copy of the first configuration settings information stored in a second non-volatile memory device, the second non-volatile memory device storing second configuration settings information used by the second non-volatile memory device to self-initialize the second non-volatile memory device; and utilizing the copy of the first configuration settings information retrieved from the second non-volatile memory device to initialize the first non-volatile memory device for subsequent access to storage cells of the first non-volatile memory device;

wherein retrieving the copy of the first configuration settings information includes retrieving the copy of the first configuration settings information from the second non-volatile memory device in a memory system, the second non-volatile memory device disparately located with respect to the first non-volatile memory device in the memory system;

the method further comprising: retrieving the copy of the first configuration settings information from the second non-volatile memory device subsequent to receiving notification from the second non-volatile memory device that the second non-volatile memory device was able to properly initialize the second non-volatile memory device based on corresponding configuration settings information stored in the second non-volatile memory device, the corresponding configuration settings information stored in the second non-volatile memory device being unique with respect to the copy of the first configuration settings information, the corresponding configuration settings information used to initialize the second non-volatile memory device.

9. The method as in claim 8 further comprising:

receiving the notification of the failed attempt from the first non-volatile memory device, the notification indicating the failed attempt by the first non-volatile memory device to retrieve a locally stored copy of the first configuration settings information in the first non-volatile memory device to initialize the first non-volatile memory device.

10. The method as in claim 8, wherein utilizing the copy of the first configuration settings information further includes:

initiating storage of the first configuration settings information to a memory block of the first non-volatile memory device, data in the memory block used by a controller in the first non-volatile memory device to initialize a set of configurations buffers in the first non-volatile memory device.

11. The method as in claim 8 further comprising:

mapping the identity of the first non-volatile memory device in the memory system to the second non-volatile memory device in the memory system.

12. The method as in claim 8, wherein receiving the notification includes:

receiving the notification of the failed attempt by the first non-volatile memory device at power up during which a controller in the first non-volatile memory device attempts to initialize the first non-volatile memory device based on retrieval of and storage of information from a non-volatile memory block in the first non-volatile memory device to configuration buffers of the first non-volatile memory device.

13. The method as in claim 8, wherein receiving the notification of the failed attempt includes:
   receiving the notification from the first non-volatile memory device, the notification indicating that the first non-volatile memory device was unable to use the configuration settings information stored in the first non-volatile memory device to properly initialize a configuration buffer in the first non-volatile memory device for subsequent access of data stored in the first non-volatile memory device.

14. The method as in claim 13, wherein retrieving the copy of the first configuration settings information from the second non-volatile memory device includes:
   from an access controller disparately located with respect to the first memory non-volatile memory device and the second non-volatile memory device, mapping an identity of the first non-volatile memory device to a specific location in the respective memory of the second non-volatile memory device that stores the copy of the first configuration settings information for the first non-volatile memory device.

15. The method as in claim 14, wherein the first non-volatile memory device and the second non-volatile memory device are configured to perform self-initialization upon power up.

16. The method as in claim 8, wherein the first non-volatile memory device and the second non-volatile memory device are configured to perform self-initialization on power up of the first non-volatile memory device and the second non-volatile memory device, the method further comprising:
   receiving the notification of the failed attempt and notification from the second non-volatile memory device in response to an access controller communicating with the first non-volatile memory device and the second non-volatile memory device, the notification indicating a status of performing the self-initialization.

17. The method as in claim 14, wherein the first non-volatile memory device and the second non-volatile memory device are both solid state memory devices, the first configuration settings information indicating how to initialize the first non-volatile memory device for retrieval of the data stored in the first non-volatile memory device.

18. The method as in claim 17, wherein the first configuration settings information includes trim information specifying how to control operation of the first non-volatile memory device.

19. The method as in claim 14 further comprising:
   retrieving the copy of the first configuration settings information from the second non-volatile memory device subsequent to receiving a communication from the second non-volatile memory device that the second non-volatile memory device was able to properly initialize the second non-volatile memory device based on the second configuration settings information stored in the second non-volatile memory device.

\* \* \* \* \*